(12) United States Patent
Hanse

(10) Patent No.: US 6,395,396 B1
(45) Date of Patent: May 28, 2002

(54) THERMAL SHOCK-RESISTANT CERAMIC ARTICLE

(75) Inventor: Eric Hanse, Feignes (FR)

(73) Assignee: Vesuvius Crucible Company, Wilmington, DE (US)

( * ) Notice: Subject to any disclaimer, the term of this patent is extended or adjusted under 35 U.S.C. 154(b) by 0 days.

(21) Appl. No.: 09/647,672
(22) PCT Filed: Mar. 25, 1999
(86) PCT No.: PCT/BE99/00041
§ 371 (c)(1),
(2), (4) Date: Nov. 17, 2000
(87) PCT Pub. No.: WO99/50008
PCT Pub. Date: Oct. 7, 1999

(30) Foreign Application Priority Data

Mar. 31, 1998 (EP) .............................................. 98870063

(51) Int. Cl.$^7$ ................................................. B32B 9/00
(52) U.S. Cl. ..................... 428/408; 428/34.1; 428/34.4; 428/34.5; 428/212; 428/213
(58) Field of Search ............................... 428/34.1, 34.4, 428/34.5, 34.6, 408, 213, 212

(56) References Cited

U.S. PATENT DOCUMENTS

| 4,093,193 A | 6/1978 | Cassidy et al. |
| 5,462,616 A | 10/1995 | Goerenz |
| 5,591,287 A | 1/1997 | Clegg et al. |
| 5,942,316 A | 8/1999 | Luhrsen |

FOREIGN PATENT DOCUMENTS

| EP | 0536584 A | 4/1993 |
| JP | 59061567 A | 7/1984 |

*Primary Examiner*—Deborah Jones
*Assistant Examiner*—Abraham Bahta
(74) *Attorney, Agent, or Firm*—James R. Williams

(57) ABSTRACT

A thermal shock-resistant ceramic article and a method of manufacturing the article include alternating layers of a first material (2) comprising a fusible, particulate ceramic composition and a second material (3), typically comprising a porous, pyrolyzable material. The layered structure increases the article's work of fracture and toughness, and may lead to improved thermal shock-resistance. The method advantageously uses a sheet, film or sleeve to prepare the article for firing. The composition, thickness, and porosity of the second material (3) will affect the desired properties. The method is particularly adapted for manufacturing cylindrical articles, including stopper rods, nozzles, and pouring tubes for the metal casting industry.

17 Claims, 2 Drawing Sheets

THERMAL SHOCK-RESISTANT CERAMIC ARTICLE

BACKGROUND OF THE INVENTION

1. Field of the Invention

This invention relates to a ceramic article and a method for the production of the article, and more particularly to an article and method comprising alternating layers of dissimilar materials to produce an article with an improved work of fracture.

2. Description of the Prior Art

Ceramic articles are, of course, well known and find many commercial uses where, for example, hardness, refractory properties or relative chemical inertness are desired. A serious deficiency of ceramic products, however, is their brittleness or, stated in other words, their poor work of fracture or toughness. This limitation has hindered the entry of ceramics into those areas where their other properties would be highly desirable, for example, U.S. Pat. Nos. 5,657,729 and 5,687,787 describe attempts to incorporate toughened ceramic parts into internal combustion engines.

Brittle materials typically fail catastrophically and often without warning. Conversely, tough materials will normally bend or deform before failure. In most applications, the latter type of failure is preferred. Common methods of testing toughness are a Single Edge Notch Bend (SENB) test and a Modulus of Rupture (MOR) test. Both involve a three point bending geometry and differ in the presence or absence, respectively, of a notch in the sample to be tested. In both, a stress on a sample is slowly increased as a function of strain. The resultant area beneath a plot of stress versus strain is the work of fracture and represents the amount of energy absorbed during one of these tests.

A tougher material has the ability to absorb greater amounts of energy than a more brittle material. One way a material may absorb energy is by microscopic morphological changes. For example, tough metals or alloys like steel absorb energy by, for example, developing dislocations, slipping across crystal planes, or undergoing crystal twinning. A material may also absorb energy by creating new surface area through a process known as crack blunting. For example, composite materials, such as fibreglass, are heterogeneous and contain a plurality of phases. When a crack reaches a phase boundary, the crack may propagate along the boundary, and create a delamination crack. In effect, the crack is blunted at the phase boundary. Blunting reduces crack propagation by spreading the energy at the crack tip over a larger area.

Generally, ceramic materials cannot absorb much energy because their crystal structure resists microscopic morphological changes. Additionally, crack blunting does not occur to any substantial extent in homogeneous materials. Attempts to improve the toughness of ceramics have concentrated on introducing some degree of heterogeneity into the ceramic. For example, an increase in toughness has been accomplished by providing a second phase within the ceramic, such as a layer of fibers, see, e.g., U.S. Pat. No. 5,589,115. Presumably, the fiber layer disrupts crack propagation by blunting the crack tip. Unfortunately, this solution is not without its flaws. The green ceramic matrix, in which the fiber is placed, shrinks when fired, but the fiber itself does not. This results in delamination of the fiber from the ceramic and creates what are essentially voids in the brittle ceramic. Voids normally act to concentrate stresses, initiate crack formation, and increase the likelihood of brittle failure. Techniques to overcome this problem involve a plurality of mats of ceramic fibers impregnated with a particulate ceramic material, liquid diluent and organic binder. This technique places the ceramic particulate in more intimate contact with the fiber. During firing, however, the ceramic particulate still shrinks. While an improvement over the prior art, this method does not completely overcome the delamination problem, and results in a ceramic composition with variable mechanical properties.

Delamination can be substantially overcome by a technique involving melt infiltration. This technique involves perfusing a molten ceramic material into ceramic fibers. Although delamination is reduced, several new problems arise. Very high temperatures are required to melt ceramics and some ceramics sublime before they melt. The high temperatures can also damage the ceramic fiber. Even if the ceramic can be melted, the viscosity of a molten ceramic is so high that the rate of infiltration into the fibers is very slow and the molten ceramic may not homogeneously wet the surface of the fibers.

The extremely high temperatures of melt infiltration can be avoided by a vapor infiltration technique, see, e.g., U.S. Pat. No. 5,488,017. At relatively low temperatures, a vapor comprising a ceramic precursor infiltrates ceramic fibers. Later the chemical is decomposed to leave a ceramic residue. For example, gaseous methyltrichlorosilane may be deposited onto ceramic fiber at just several hundred degrees centigrade and later decomposed to silicon carbide at a temperature which may be less than 1200° C. A silicon carbide matrix is created which is reinforced by the ceramic fiber. Although overcoming some of the disadvantages of previous processes, vapor infiltration is very time-consuming and limited to ceramics with volatile precursors.

U.S. Pat. No. 5,591,287 avoids using fibers, melts or volatile precursors. This patent creates one or more zones of weakness between layers of sinterable, particulate ceramic material. The zones of weakness consist of very thin layers of non-sinterable or weakly sinterable material. Examples of a non-sinterable material include carbon or an organic polymeric material, which may pyrolyze into carbon. A weakly sinterable material may form bonds with itself and the sinterable, particulate ceramics, but the bonds so formed should be substantially weaker than the bonds formed within and between the sinterable ceramic layers.

The zones of weakness should be less than about 50 microns to permit sintering between ceramic layers. Such thin zones of weakness may be created by spreading a suspension of non-sinterable or weakly sinterable material over one surface of a preformed, sinterable ceramic. Many zones of weakness may be produced by depositing the non-sinterable material between each of a plurality of ceramic layers. The resulting zones of weakness may deflect cracks propagating through the ceramic. The crack may then travel along the zone of weakness and form a delamination crack between the layers of ceramic. The process of delamination increases the work of fracture. Unfortunately, this method is limited to sinterable ceramic materials that have been preformed into a layer over which a non-sinterable material can be spread. This restricts both the composition and the geometry of articles, which may be made using this method.

Despite these known methods for improving the toughness of ceramic articles, there is still a need in the industry for a method to produce quickly and cheaply a tough morphology in a commercially useful shape. Simply mixing a ceramic fiber into a sinterable ceramic often leads to delamination between the two materials. Methods to prevent delaminations are either too time-consuming, limit article geometry or composition, produce inconsistent results, or require excessive temperatures. A commercially viable method is needed to toughen a ceramic article.

SUMMARY OF THE INVENTION

The present invention relates to a multilayer ceramic article and a method of making the same. In a broad aspect, the article comprises a plurality of layers of a first phase comprising a fused and/or carbon bonded particulate ceramic; and, disposed between adjacent layers of first phase a layer of a mechanically or chemically different second phase. The article of the present invention is depicted as possessing a substantially improved work of fracture compared to a ceramic article without a layered structure.

The first phase is described as a fused or carbon-bonded, particulate ceramic. The second phase may be a porous material, such as a metal mesh, or a weakly fused or carbon-bonded refractory, or may even comprise the pyrolyzed residue of a combustible material. Alternatively, the second phase may be fused by a process independent of the first phase, such as by sintering if the first phase is a carbon-bonded ceramic. In other embodiments, the second phase may share a similar bonding mechanism with the first phase but will possess significantly weaker mechanical properties.

The invention describes layers of the first phase as preferentially having a thickness from between about 0.5 mm to about 10 mm with layers of the second phase having a thickness from about 0.005 mm to about 2 mm.

One aspect of the invention describes the layers as spiralling along the longitudinal axis of a cylindrical shape. The article may also comprise a bore. The present invention also relates to a method for producing a ceramic article having improved thermal shock-resistance and toughness. In a broad aspect, the invention describes a method to fashion a ceramic article by alternating layers of a first material with a second material. The first material may be a fusible or carbon-bonded, particulate ceramic. The second material is expected to form a weakly fused or weakly carbon-bonded layer. Alternatively, the second material may fuse by way of a process independent of the first material, such as by sintering if the first material is a carbon-bonded ceramic. The second material may be proffered as a sheet, film, membrane, or even a casing onto or into which the first material may be placed. The layers are then pressed into a piece and fired to form the finished article.

In one aspect of the invention, the second material is described as a combustible material, which may pyrolyze at elevated temperatures. The combustible material may be an organic material, such as plastic, paper, cotton or other natural or synthetic polymer.

Still another aspect of the invention describes a process to make a layered, cylindrical article. The first material is described as a ceramic refractory and the second material may be a combustible sheet. Layers are alternated by coating the combustible sheet with the ceramic, compacting the ceramic on the sheet, and subsequently rolling the coated sheet onto itself thereby creating a cylinder with a "jelly roll" morphology. The second material may alternatively be a tubular casing. The ceramic material may then be inserted into the casing, compacted, and formed into any desired shape, including a "jelly roll."

A still further aspect of the invention describes a method of making the article into a tube by wrapping a coated sheet or filled casing around a mandrel, pressing the wrapped sheet or casing on the mandrel, removing the piece from the mandrel, whereby a bore is created where the mandrel had been, and firing the wrapped sheet or casing to make the article.

Other details, objects and advantages of the invention will become apparent as the following description of a present preferred method of practising the invention proceeds.

DESCRIPTION OF THE DRAWINGS

In FIG. 1, an article fashioned into a tube by the method of the invention is shown. The tube 1 comprises a plurality of alternating layers of a first phase 2 and a second phase 3. The total number of layers depends upon the thickness of each layer and the desired thickness 4 of the tube 1. Both the first phase 2 and the second phase 3 spiral outward from a bore 5 within the tube 1. Such a geometry inhibits a crack 6 from propagating perpendicularly to the longitudinal axis 7 of the tube 1.

In FIG. 2, a method of making a tubular ceramic article is illustrated. An organic sheet 10, which is comprised of a second material, is unwound from a take-off roll 11. A first material 12 is deposited on the sheet 10, and the sheet 10 is wound on a mandrel 13 to form a tube 14 having a plurality of layers until the desired thickness 15 is achieved.

In FIG. 3, an alternate method involving a casing 20, which comprises a second material is depicted. A first material 21 is feed into a hopper 22 and forced into the casing 20. The filled casing 20 is compacted between rollers 23 and wound up on a mandrel 24 to form a tube 25.

DESCRIPTION OF THE PREFERRED EMBODIMENT

Figure 1:
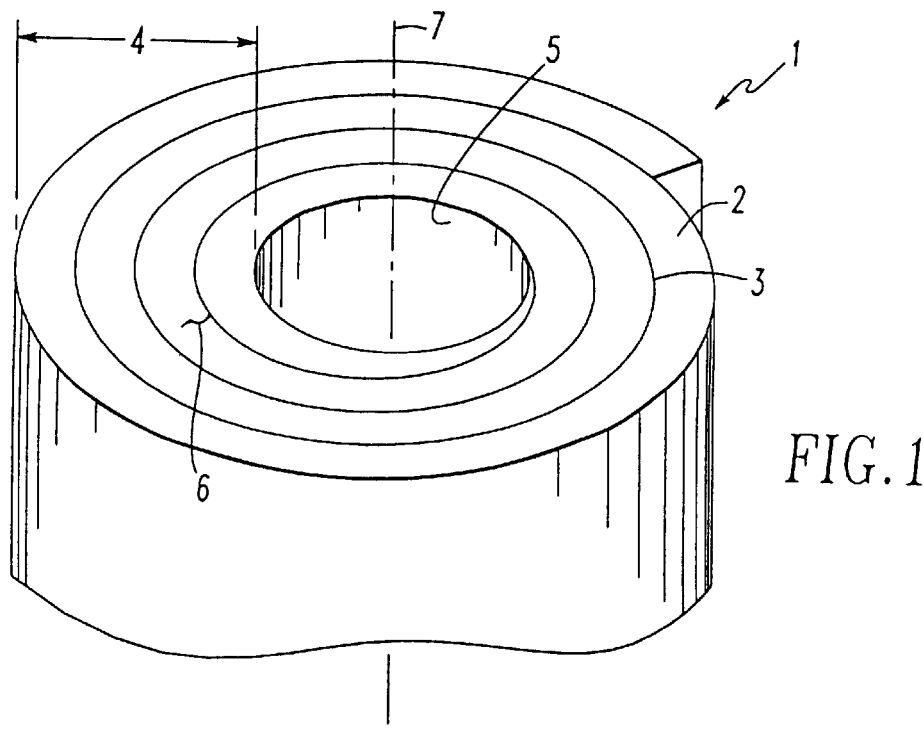
FIG. 1 is a drawing of an article having the alternating layered structure of the invention.
Figure 3:
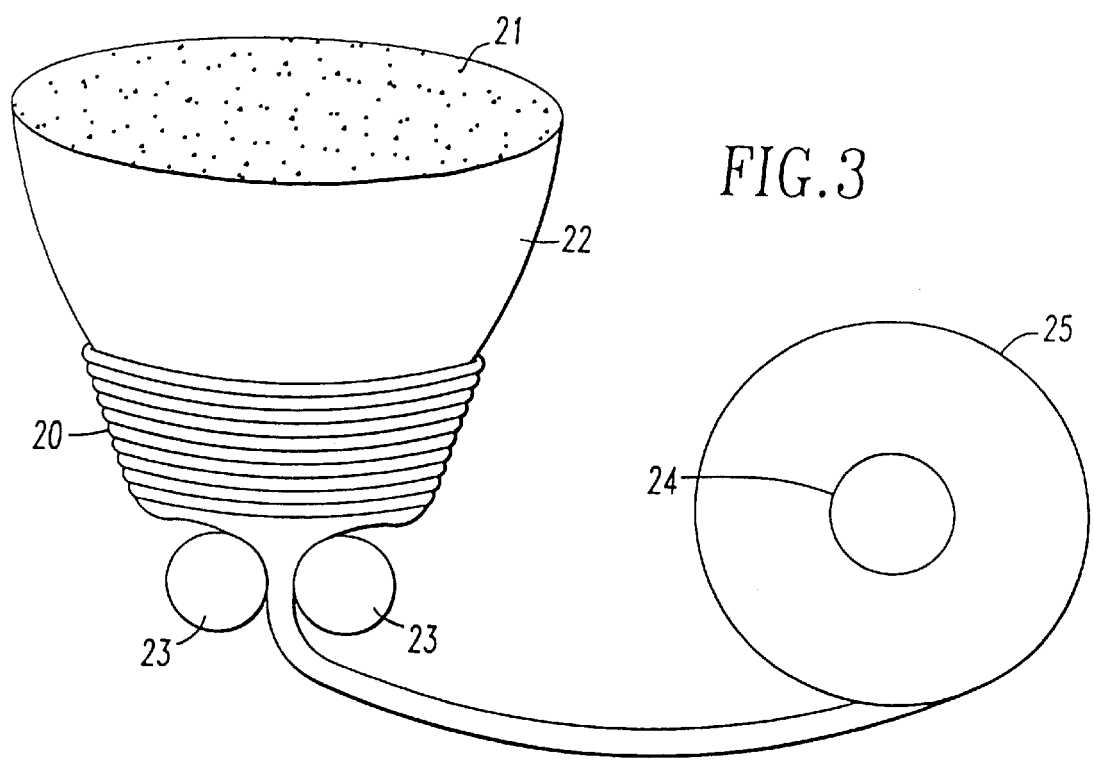
FIG. 3 shows a method for creating the article of FIG. 1 using an organic casing.
Figure 2:
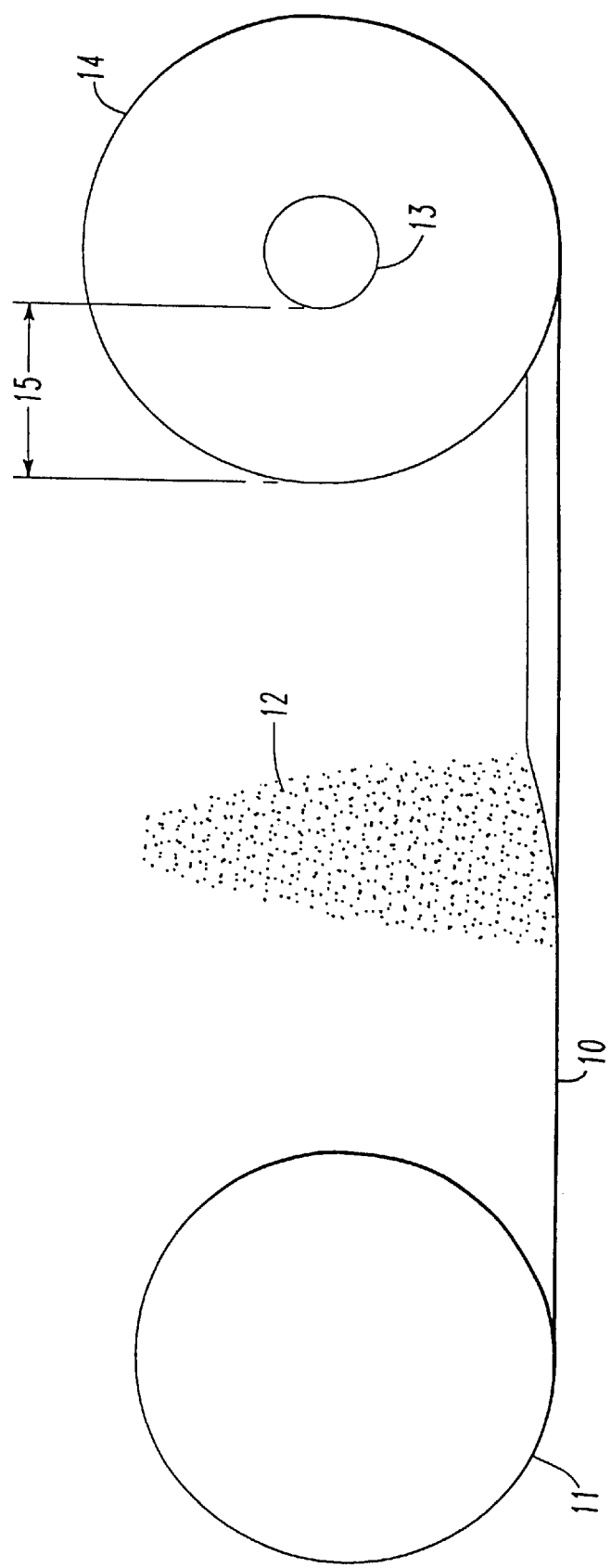
FIG. 2 depicts a method for creating the article of FIG. 1 using an organic sheet.

The present invention describes a ceramic article, which has improved thermal shock-resistance and toughness, and a method of producing the same. The article is especially useful in the continuous casting of molten metals, and may be manufactured so that different ceramic compositions are exposed to the molten metal stream, slag line, and mould area. The method comprises depositing and compacting a first material onto or into a second material. The substrate may then be shaped, pressed, and fired into a ceramic article.

The article comprises a plurality of layers comprising at least two phases. Adjoining layers of a first phase are in physical contact with each other, and between layers is an interface. The interface comprises an area of reduced contact between adjacent layers of a first phase, whereby a propagating crack may preferentially follow the interface and effectively blunt the crack. Crack blunting increases the energy absorbed by the article, as measured by work of fracture, and improves the article's toughness.

The first phase may comprise any type of fusible or carbon-bonded, particulate ceramic. For convenience, "fused" or "fusible" is meant to include those ceramics, which may be "sintered" or "carbon-bonded". A particulate ceramic comprises any type of ceramic whether powdered, granular, fibrous, chunked, or any shape or combination of shapes, and of whatever size, which are amenable to being pressed into a form. Fusible implies a ceramic which may be fired to create a fused article out of a collection of ceramic particles. A binder is often used to hold together a fusible ceramic before firing. The ceramic is ultimately fired at a temperature high enough to coalesce the ceramic particles, thereby creating a fused mass. A certain amount of void fraction may remain because the ceramic particles do not completely fuse or lose their individual identity. In contrast, a non-fusible ceramic may sublime or degrade before fusion occurs, or the selected firing temperature may simply be too low to trigger fusion. The fusible, particulate ceramic may be selected from any number of commonly known ceramic compounds, and will usually, at least in commercial applications, comprise a mixture of ceramic compounds. The actual mixture chosen will depend upon the particular application in which the ceramic article will be used. For example, ceramic compositions, which are used in handling molten metals may comprise alumina, silica, silicon carbide, zirconia, and other refractory ceramic compounds. A typical refractory ceramic mixture used in stopper rods for steel processing may comprise major amounts of alumina and graphite with minor amounts of silica and other refractory ceramics. Graphite, a non-ceramic particulate material, is commonly added to improve thermal shock-resistance. Alternatively, a specialised refractory having excellent corrosion and erosion resistance, but poor thermal shock-resistance, may comprise a major amount of alumina with minor amounts of zirconia and silica.

The invention also creates the possibility of using new ceramic compositions, which take advantage of the improved toughness of a layered morphology. For example, ceramic compositions may be used that previously had been too brittle or thermal shock-sensitive but possessed otherwise desirable properties. Ingredients, which had been necessary for certain physical properties, may be reduced or eliminated. In particular, graphite, which improves thermal shock-resistance, undergoes deleterious oxidation. A layered morphology may enable the use of less graphite, resulting in a product less sensitive to oxidative degradation.

The invention is not limited to using only a single ceramic mixture or composition within any one article. In fact, it is contemplated that a plurality of ceramic compositions will be used in any finished article. This may be particularly advantageous when different properties are desired at different places of the finished article. For example, in sub-entry shrouds for the continuous casting of molten metals, a first ceramic composition having good slag resistance may occupy an outer layer of the shroud, a middle layer may comprise a ceramic composition having good thermal shock-resistance, and an inner composition may comprise a good erosion-resistant ceramic.

Along with a first phase comprising a ceramic material, the article also has a second phase. The second phase separates and may sandwich layers of the first phase. The second phase may comprise, for example, carbon fibers, a metallic mesh, a pyrolyzed residue, a relatively weakly fused ceramic, or a ceramic fused by mechanism different than the mechanism of the first phase. In all cases, the second phase is intended to interfere with inter-layer fusion of adjacent layers of first phase. Such interference creates an interface which is weaker than the first phase. The interface is characterized as a region comprising relatively few bonds between adjacent layers or as a discontinuity in the article's microstructure. The second phase may be introduced as a powder, slurry or suspension but, preferably, the second phase begins as a substrate capable of supporting or containing the ceramic particulate. Most commonly, the substrate will be a sheet or casing. The term "sheet" is meant to include any film, textile, cloth, or any other like substance characterized by two of its dimensions greatly exceeding its third. "Casing" is meant to include any flexible sheath, jacket, tube, sleeve or similar article, which may be formed by connecting opposing edges of a sheet, and into which the ceramic particulate may be placed.

A sheet or casing will most commonly be an organic material, such as a synthetic or natural polymer, but may also include a mesh made from an inorganic material. Inorganic materials include metal or inorganic fibers such as graphite or ceramic fiber. Synthetic polymers include, for example, polyolefins or polyesters, but may include any type of synthetic polymer that may be fabricated into sheet or casing. Natural polymers include, for example, paper or cotton, but other natural polymers may also be used.

A sheet is preferably a paper product, owing mostly to paper's low cost, good mechanical strength, and low stretching under tension. The sheet is likely to experience tension during processing, and many common synthetic polymers stretch unacceptably. The thickness of the sheet is roughly dependent on the thickness of the ceramic layer. A thicker sheet is preferred to support a thicker ceramic layer. The sheet will generally be thinner than the ceramic layer and often will be about one-tenth the thickness of the ceramic layer. It is appreciated, however, that the invention incorporates a range of thicknesses at least between about 0.005 mm to about 2.0 mm, irrespective of the thickness of the ceramic layer.

Typically, the sheet, especially organic sheets containing oxygen as part of their chemical composition, will pyrolyze at temperatures needed to fuse the ceramic material. Pyrolysis may leave a trace residue between adjacent ceramic layers, but may also leave a defect, which is weaker than the rest of the fused article. The defect may be described as a weakly fused region relative to the fusion found in the ceramic layers. A crack propagating within a ceramic layer may impact this region and deflect along the defect thereby forming a delamination crack. The energy needed to produce the delamination increases the work of fracture and, correspondingly, the toughness of the ceramic article.

The combustible sheet will preferably have holes. The holes should permit adjacent layers of the ceramic particulate to contact each other through the holes in the sheet. Upon firing of the article, contact between the ceramic layers through the holes may permit some fusion between layers. The combustible sheet is expected to pyrolyze at firing temperatures but not before preventing substantial contact and, therefore, fusion in the region between ceramic layers. The region, which had been occupied by the now pyrolyzed sheet, may after firing contain a weakly fused defect in the ceramic article.

It will be understood that, even in the absence of holes in the combustible sheet, some fusion may occur between ceramic layers. Holes, however, may permit the sheet to be thicker and, consequently, stronger and easier to handle than sheets without holes. Weakly fused defects may be produced by sheets without holes, but these sheets may need to be thinner than corresponding porous sheets. A thinner sheet could lead to manufacturing difficulties when producing a ceramic article according to the method of this invention. Thinner sheets are expected to flex more and support less ceramic particulate before buckling.

A sheet without holes or a sheet of excessive thickness may even create defects in the ceramic article that actually decrease toughness. These defects may result from little if any fusion between ceramic layers after the combustible sheet has pyrolyzed. A crack propagating through a ceramic may encounter a defect, which had been created between ceramic layers by pyrolysis of a combustible layer. The crack may deflect along the plane of the defect. Without some fusion between the ceramic layers, the crack will propagate rapidly along the plane of the defect because no additional energy will be needed, for example, to break bonds formed by fusion. Toughness will generally not be improved by this type of defect because, as previously taught, greater toughness correlates with greater energy input. Cracking without the need for energy input would not be expected to improve toughness.

A competition exists, therefore, between maximising and minimising the degree of fusion between ceramic layers. Less fusion between ceramic layers creates a more "perfect" defect, and may increase the chance that a crack propagating through the ceramic will deflect along the plane of the defect. Once the crack has deflected along the defect, however, it may then be desirable to have as many points of fusion as possible because more energy would be needed to break the bonds. But, the greater the degree of fusion between ceramic layers, the more the defect begins to look like the ceramic matrix and the less chance the crack will deflect along the defect. The number, shape, and size of holes, as well as the sheet thickness, will affect the degree of fusion in the article; therefore, the combustible sheet should be selected with this balance in mind.

The combustible sheet will preferably be a porous paper with a thickness about 0.005 mm to about 0.5 mm. A porous paper is a paper which permits layers of fusible, particulate ceramics on either side of the paper to contact one another intermittently. Porous paper may include those papers having holes, which are similar to or larger than the size of the ceramic particulate. Such holes may, for example, be defined by spaces between cellulose fibers making up the paper. The holes may also be created by mechanical means, such as by perforating the paper. Paper possesses a substantial amount of rigidity and strength, which is needed to support the ceramic material in the method of the invention. At the same time, the paper may be made thin enough to permit intermittent contact between ceramic layers on either side of the paper. Paper also has a relatively low flash point and leaves minimal pyrolyzed residue.

The combustible sheet may also be a polymer film, such as polypropylene, polyethylene or any flexible organic polymer sheet. Plastic films normally will be contiguous and free of pinhole defects. This property may inhibit fusion between ceramic layers; although, holes may be made in the plastic to improve fusion between ceramic layers. Polymer films disadvantageously may stretch when under tension, as may be experienced by the film during processing.

Holes in a combustible sheet permit the sheet to be substantially thicker than without holes. For example, porous paper sheets over 1.0 mm thick may still permit adjacent ceramic layers to contact one another and fuse together when fired. Handling includes all those processes concerned with the sheet itself, for example, rolling or unrolling the sheet, and also all those processes related to the sheet in combination with the ceramic. By comparison, nonporous sheets should be substantially thinner to achieve some fusion between ceramic layers. As a sheet becomes thinner, the sheet becomes increasingly flexible and subject to stretching. These properties make the sheet more difficult to handle.

Mechanical properties of the sheet are important because the invention utilises the sheet as a support in the process. In one embodiment, the ceramic article is cylindrical as, for example, a nozzle, pouring tube or stopper rod to be used in molten metal processing. A combustible organic sheet is unwound from a take-off roll and transported horizontally towards a take-up roll. Between the two rolls, the sheet is covered with a fusible, particulate ceramic to a thickness between about 0.5 mm and about 10 mm. During the process, the composition and thickness of the ceramic layer may be changed one or more times. The sheet will have a thickness equal to at least about one-tenth the thickness of the ceramic layer. Thinner sheets may also be used if the sheets' mechanical strength is sufficient. Thicker sheets may also be used if desirable. Preferably, the sheet has a thickness between about 0.05 mm and 1.0 mm. After being deposited on the sheet, the ceramic material is then compacted to increase the density of the ceramic layer. The ceramic layer should be compacted enough to permit easy handling but should still be flexible enough to be bent without cracking. The sheet with the compacted, fusible ceramic is wound up on the take-up roll. When the desired thickness on the take-up roll is achieved, the take-up roll is removed. Material on the take-up roll may comprise the ceramic article or the material may be rewrapped into another shape or around another ceramic piece. In this fashion, spirals of layers of sheet and ceramic material are deposited within the ceramic article.

Rewrapping the compacted ceramic/sheet permits a second compacted ceramic/sheet to be co-wrapped with the first. In this fashion, two substantially different ceramic compositions may be intimately fused to form the finished article. For example, a good thermal shock-resistant ceramic may be layered with a good erosion-resistant ceramic in alternating layers. The finished article may gain the benefits of good thermal shock-resistance and good erosion-resistance. In a like fashion, a third, fourth or more ceramic compositions may be co-wrapped to achieve optimal properties.

After being formed into its final shape, the wrapped roll is pressed into a piece. Pressing can utilise any number of known processes, for example, as is common in three dimensional objects, isostatic pressing may be used. The piece is then fired at a temperature necessary for fusion. Of course, firing temperature depends on the ceramic composition. Firing temperature may also depend on several other factors, such as firing time and desired porosity in the finished article. Such parameters are well known by those skilled in the art. After firing, the finished ceramic article results.

Although an article of this invention may be produced using sheet, the preferred method of producing the disclosed article comprises placing a ceramic particulate into a casing and compacting the filled casing. Techniques used in the sheet process may also be applied when using a casing. Unlike compacting on a sheet, the compacted casing presents an easy way to manipulate the ceramic particulate because the ceramic particulate is completely contained within the casing. By comparison, compacted ceramic on the surface of a sheet could fall from the sheet if turned upside down or even sideways. Filling the casing with ceramic particulate normally involves a technique similar to sausage making, in that the ceramic is placed into a hopper and forced into a casing. The filled casing is compacted, and the compacted casing may be manipulated in any manner to fashion an article. Conveniently, the casing is compacted between a pair of rollers, but a single roll may be preferred in certain circumstances. Naturally, the type of ceramic particulate being fed into the casing at any one time may vary depending on the type of article being made and the properties required. For example, a thermal shock-resistant ceramic may be used at one stage of casing filling, while a more erosion-resistant composition may be used during a later stage. Several casings having different ceramic compositions may even be co-wrapped or copressed and fired into the finished article.

As described, the casing may be any type of tubular material such as paper or synthetic tubing, but in practice, the preferred material will be a cotton gauze. Cotton gauze is inexpensive, readily available, pyrolyzable, and is comprised of a very open weave containing many holes. The gauze may be placed under tension to completely open the weave. The gauze may also be impregnated with binder, graphite, or any other substance shown beneficial to the process. It is useful to note that, unlike sheet-produced articles, an article produced by winding up a compressed casing will have a morphology characterized by a layer of ceramic followed by two layers of the casing. Practically, the two distinct layers may be considered as one. The compacted casing may be likened to a sheet; therefore, it is anticipated that a second or even third layer of ceramic particulate may be placed on the outer surfaces of the compacted casing. In either embodiment, the layers within a finished article may be other than strict alternating layers of ceramic/substrate expected in a sheet-produced article.

Whether using the sheet or casing process, the ceramic article produced will commonly be cylindrical, and may also comprise a bore. Nozzles and pouring tubes will naturally contain a bore. A bore may be easily fashioned in the finished article by winding the coated sheet or filled casing around a mandrel. Pressing and firing will then create a ceramic article with a bore. Layers comprising the first and second materials will spiral outwardly from and around the bore; although, this spiral need not be concentric and may even be interrupted by other components within the article or by the required shape of the finished article. The process is not limited to the creation of cylindrical articles. Various other shapes may also be formed. In articles produced using sheet, the sheet should be at least about 0.005 mm to about 0.5 mm; although, thinner or thicker sheets may be used depending on processing conditions. Additionally, the ceramic is not necessarily compacted before pressing. For example, a method to produce a simple board product may comprise laying down a sheet, placing a particulate, fusible ceramic material on the sheet, laying down a second sheet and a second layer of ceramic material, and continuing to alternate layers until the desired thickness is achieved. Such a process is also useful in manufacturing slide gate plates. The entire article may then be pressed and fired to form the multilayer article. Manufacturing using the casing method may be even more versatile than manufacturing with sheet material. The casing holds the ceramic in place and, consequently, may be positioned with greater efficacy.

The layered article may be embedded or even fully encapsulated in a non-layered object. This may be especially useful to arrest cracking at particular points of a commercial product. For example, a sub-entry shroud used in the continuous casting of steel will experience extreme thermal stress, chemical assault and erosion at the slag line. Inclusion of a layered article within the shroud at the slag line may effectively arrest cracks and permit the use of more erosion-resistant ceramics.

EXAMPLE I

A quantity of porous paper of thickness 0.05 mm was removed from a roll of paper. The paper was cut to a predetermined length and flattened. A standard mix of a fusible, particulate ceramic composition was deposited onto the paper. The mix comprised 50–55 weight percent alumina, 13–17 weight percent silica, and 30–35 weight percent graphite. The composition was selected as representative of the type of ceramic mix used in nozzles for the continuous casting of molten steel. The ceramic mix on the paper was compacted to a thickness of 1.0 mm, and the coated paper was then continuously wrapped around a steel mandrel until a desired thickness was achieved. The coated paper on the mandrel was isostatically pressed to compact the ceramic particles, thereby forming a piece. The piece was fired at a temperature of up to 1000° C. in a reducing atmosphere to form a ceramic article. The ceramic article was cut into test samples for Modulus of Rupture (MOR) tests. A comparative, non-layered standard was created consisting of the ceramic mix without the paper sheet. The same ceramic composition, pressing and firing conditions were used as for the layered piece. Ten samples of the non-layered piece were also cut for MOR tests. The multilayer piece had an average work of fracture equal to 177,000 erg/cm$^2$ compared to the standard piece that had an average work of fracture of only 42,000 ergs/cm$^2$.

EXAMPLE II

A tubular article of the present invention was made by feeding a particulate ceramic mix into a first open end of a hopper. The same ceramic composition was used as in the preceding example. A medical grade cotton gauze sleeve was placed over a second open end of the hopper. The ceramic was extruded from the hopper into the cotton sleeve. The sleeve was drawn between two rollers whereby the ceramic mix inside the sleeve was compacted. The compacted sleeve was wrapped around a mandrel and shaped into a cylinder. The wrapped sleeve was isostatically pressed at up to 140 MPa (20,000 psi) and fired below 1000° C. in a reducing atmosphere.

EXAMPLE III

Particulate alumina-graphite was compressed inside a cotton gauze sleeve and formed into an annular ring having twelve layers of alumina-graphite. Each layer was less than 5 mm thick. A sub-entry shroud was created with the annular ring at the slag line and completely encapsulated by the body of the shroud. The shroud was placed into molten steel at 2900° F. to the level of the annular ring. After reaching temperature, the shroud was removed and sprayed with water to simulate extreme thermal shock conditions. The exterior of the shroud cracked at the level of the annular ring. After sawing the shroud longitudinally, the crack was clearly seen to begin at the exterior of the shroud and to stop at the multi-layer annular ring. In a similar shroud without the annular ring, the crack extended completely through the shroud. The annular ring, which was made from a layered material, was deemed capable of blunting the advancing crack tip.

What is claimed is:

1. A multilayer ceramic article comprising:
    a plurality of layers of a first phase comprising a particulate ceramic selected from a group consisting of fused and carbon-bonded materials; and
    a layer of a second phase disposed between adjacent layers of first phase, where the second phase comprises a material different from the first phase.

2. The multilayer ceramic article of claim 1, wherein the second phase is chemically different from the first phase.

3. The multilayer ceramic article of claim 1, wherein the second phase is mechanically different from the first phase.

4. The multilayer ceramic article of claim 1, wherein the layers of first phase have a thickness from about 0.05 mm to about 20 mm and the layer of second phase has a thickness from about 0.005 to about 2 mm.

5. The multilayer ceramic article of claim 1, wherein the second phase comprises at least one material selected from the group consisting of pyrolized residues of a combustible material, carbon fibers, metal mesh, weakly fused particulate refractory, and weakly carbon-bonded particulate refractory.

6. The multilayer ceramic article of claim 1, wherein the article is at least partially encapsulated in a non-layered object.

7. The multilayer ceramic article of claim 1, wherein at least one layer of first phase has a different composition than an adjacent layer of first phase.

8. The multilayer ceramic article of claim 1, wherein at least one layer of first phase comprises an erosion-resistant material and at least one layer of first phase comprises a thermal shock-resistant material.

9. The multilayer ceramic article of claim 1, wherein the article comprises a slide gate plate.

10. The multilayer ceramic article of claim 1, wherein the article comprises a body having an outer surface and a substantially cylindrical shape with a longitudinal axis, and the layers of first phase and second phase spiral around the longitudinal axis.

11. The multilayer ceramic article of claim 10, wherein the cylindrical shape has an inner surface defining a bore.

12. The multilayer ceramic article of claim 11, wherein the article is a nozzle for use in the continuous casting of molten metals.

13. The multilayer ceramic article of claim 12, wherein the bore is aligned parallel to the longitudinal axis, the body has a wall thickness defined by the outer and inner surfaces, and the wall thickness comprises the layers of first and second phases.

14. The multilayer ceramic article of claim 13, wherein the article comprises at least three first phase layers and at least two second phase layers.

15. The multilayer ceramic article of claim 1, wherein the multilayer article is produced by a method comprising:

preparing a laminate comprising at least two layers of the first phase separated by a sheet of the second phase;

shaping the laminate into a shape;

pressing the shape to form a piece in which the layers of first phase are each from 0.05–20 mm thick and the sheet of second phase is from 0.005–2.0 mm thick; and firing the piece at a temperature sufficient to fuse the particulate ceramic composition.

16. The multilayer article of claim 15, wherein preparing the laminate comprises filling a sleeve with the first phase and stacking a plurality of filled sleeves, and wherein the sleeve comprises the second phase.

17. A ceramic article comprising:

at least one layer of a first phase comprising a particulate ceramic selected from the group consisting of fused and carbon-bonded materials; and a layer of a second phase encapsulated within the first phase, where the second phase comprises a material different from the first phase.

\* \* \* \* \*